July 21, 1931.  N. BROWN  1,815,545
HOG RINGING DEVICE
Filed June 30, 1928  3 Sheets-Sheet 1
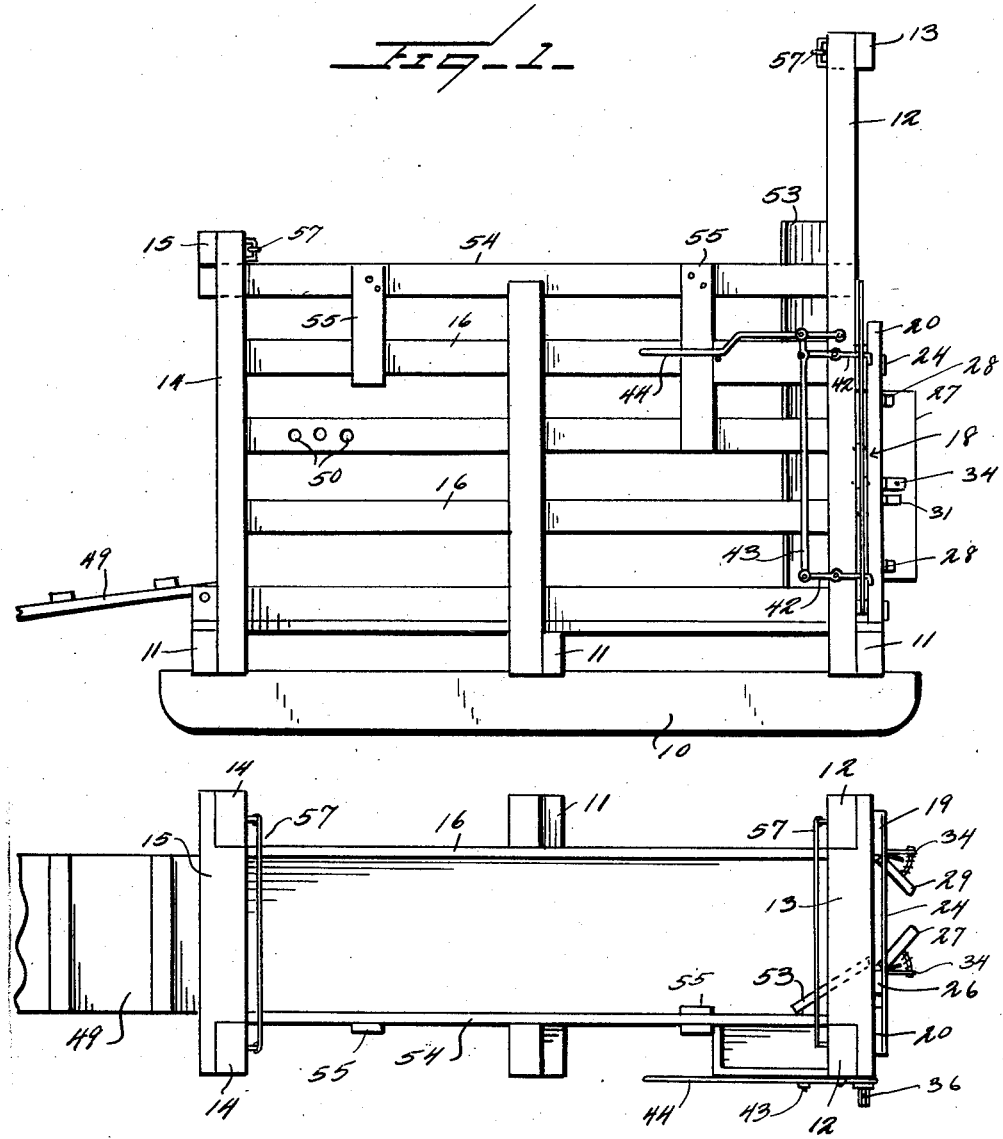
Inventor
N. Brown
By Watson E. Coleman
Attorney

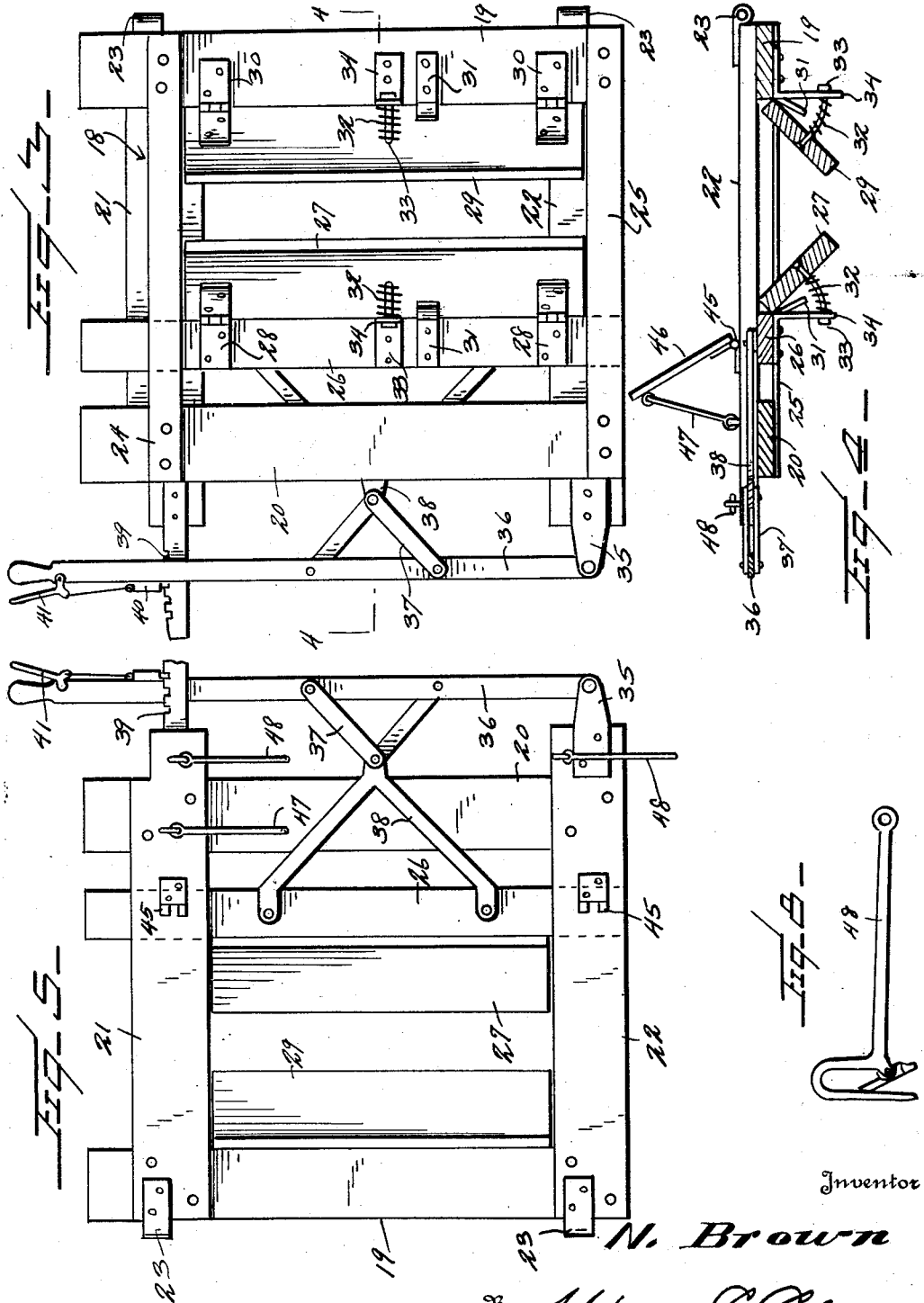

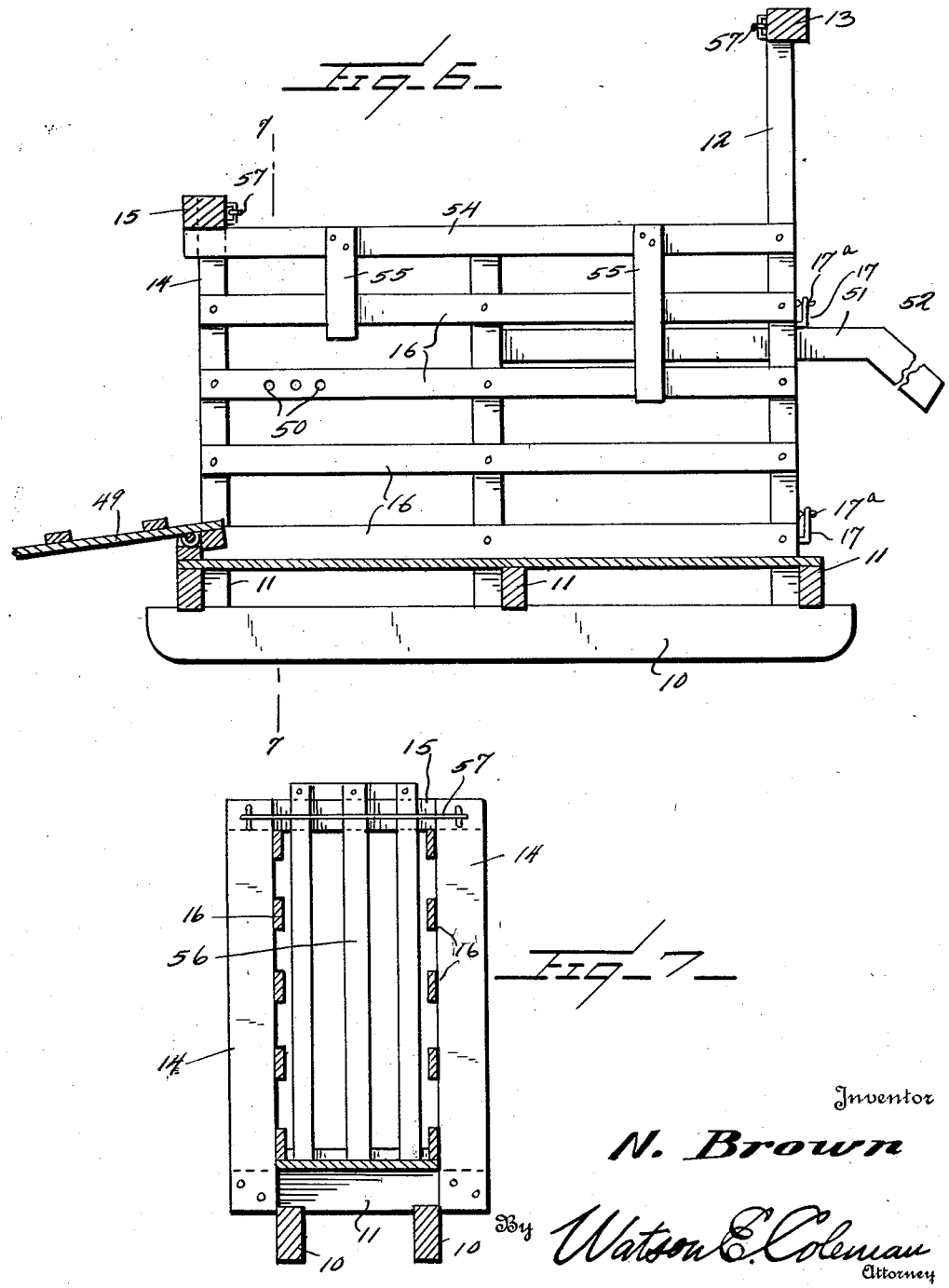

Patented July 21, 1931

1,815,545

UNITED STATES PATENT OFFICE

NEWELL BROWN, OF SELMA, IOWA

HOG RINGING DEVICE

Application filed June 30, 1928. Serial No. 289,456.

This invention relates to hog ringing crates designed for the purpose of ringing hogs, dehorning cattle and performing other operations of a like nature.

The general object of the present invention is to provide a crate of this character with a swinging and detachable gate so constructed that it may be mounted either upon the crate or mounted upon a separate post where an operation is being conducted without the crate, this gate having adjustable means for clamping the head of the hog and preventing him from withdrawing his head after the head has been inserted through the gate until it is desired to free the hog entirely.

A further object is to provide an attachment for the crate whereby the head of an animal to be dehorned may be held in proper position for the dehorning operation.

A still further object is to provide improved means whereby the animal may be guided so that the head of the animal may be projected through the head clamping means.

Another object is to provide improved means whereby the head clamping means may be held in adjusted position by the operator.

My invention is illustrated in the accompanying drawings, wherein:—

Figure 1 is a side elevation of a crate constructed in accordance with my invention;

Figure 2 is a top plan view of the crate shown in Figure 1;

Figure 3 is a front elevation of the door of the crate detached;

Figure 4 is a section on the line 4—4 of Figure 3;

Figure 5 is a rear elevation of the door shown in Figure 3;

Figure 6 is a vertical sectional view through the crate showing the means for holding an animal's head while dehorning;

Figure 7 is a section on the line 7—7 of Figure 6, showing a closure for the rear end of the crate;

Figure 8 is an elevation of one of the hooks 48.

Referring to these drawings, it will be seen that the crate consists of longitudinal runners or sills 10 upon which are mounted the transverse beams 11. Extending upward from the forward beams 11 are the uprights 12 connected at their tops by the cross beam 13. At the rear end of the crate are the uprights 14 connected by a cross piece 15. The forward uprights are connected to the rear uprights by the longitudinally extending slats 16 which may be of any desired type or arrangement. The place of the slats may be taken by wide boards if desired. The forward uprights 12 carry upon them the upwardly extending pintles 17 upon which the gate, designated generally 18, is mounted.

This gate consists of the vertical members 19 and 20 and the upper and lower cross bars 21 and 22. The gate carries the hinges 23 which are adapted to be slid downward upon the pintles 17. Thus the gate may be detached whenever desired and held by cotter pin 17a.

Attached to the uprights 19 and 20 are the upper and lower cross bars 24 and 25 which are, of course, spaced from the cross members 21. Disposed between these guides 24 and 25 is a vertical post 26 which slides from or toward the post 19. Hinged upon the post 26 is a leaf 27 hinged thereto by the hinges 28 and hinged upon the post 19 is the leaf 29 held thereon by the hinges 30. An angular stop 31 associated with each leaf prevents it being opened too far, and a spring 32 engaged with a curved rod 33 supported by a bracket 34 acts to urge these leaves toward a closed position but permits the leaves to be opened out to a distance permitted by the stops 31.

The post 26 is slidable, as before stated, transversely of the gate, and to this end there is pivotally mounted upon an ear 35 a lever 36. This lever is connected by a pair of converging links 37 to a yoke 38 which engages the sliding post. The lever 36 operates over a ratchet toothed rack 39 and is provided with a pawl 40 adapted to be withdrawn from engagement with the rack by the handle 41. It is obvious that by forcing the handle over in one direction, the shiftable post 26 will be closed toward the post 19 and that it will be held in this position by the pivoted latch or pawl 40.

It will be obvious that by retracting the pawl, the lever may be shifted to shift the slidable post with its leaf into any desired relation to the post 19 and its leaf. Thus the distance between the posts and between the leaves may be regulated to suit the size of any hog which is to be operated on.

For the purpose of holding the gate closed, I provide the pivoted latches 42 which are pivoted upon one of the posts 12 and are connected to a vertically movable link 43 which at its upper end is provided with a handle 44 whereby the link may be raised and lowered when the latch is depressed or raised. Mounted upon the inside face of the gate and specifically upon the upper and lower cross bars 21 are the hinges 45 upon which is mounted a wing 46. When this gate is disposed upon the end of the crate, this wing is removed but oftentimes a veterinary desires to use the gate without the crate, and in that case the gate is designed to be attached to a tree, post or any other situation, and in order to guide the animal so that it will pass its head between the leaves 29 and 27, the wing 46 is used. This wing is held in adjusted position by means of a hook 47.

The gate is also provided with snap hooks 48 so that when the gate is mounted upon a tree, post or the like and not used in connection with the crate, the gate may be held in a closed position by engaging these hooks with a nearby post, tree or the like. A runway 49 is provided which inclines upward to the floor of the crate where the crate is used.

In order to prevent the animals from backing out of the crate where animals, such as cows, are being dehorned, one of the longitudinal bars of the crate is provided with a plurality of holes 50 through which transverse pipes or bars may be placed at different distances according to the length of the animal and which will act to prevent the animal from backing out of the crate. In this dehorning operation, a longitudinal bar, designated 51, is used having a downwardly turned forward end 52. This bar is attached to the crate along one side thereof by any suitable means as, for instance, to the forward and intermediate posts on one side of the crate and the animal's head is strapped or otherwise attached to the downwardly extending portion 52 which acts to hold the animal's head in a natural position and in a position most convenient for dehorning.

Attached to the inside face of the crate adjacent its forward end and on the side opposite to the pintles upon which the gate is mounted is a hinged wing 53 which acts as a guide to cause the animals to move toward the opening in the gate. Preferably the crate is provided with a top bar 54 having vertical members 55 which are adapted to embrace the top slat 16 of the crate so that this member may be adjusted to animals of different height. Where the crate is to be used for the transport of animals, end pieces 56 are provided adapted to be inserted in guides 57 at the forward and rear ends of the crate so that the animal may be transported within the crate, the gate, of course, being under these circumstances removed.

It will be seen that with this construction the gate may be used separately from the crate or in connection therewith. The sliding bar supporting the leaf 27, of course, is to be adjusted in accordance with the animal's size and then the latch or lever 36 holds this sliding bar in its adjusted position with the leaf 27 at a predetermined distance from the leaf 29. The animal in the crate shoves his head clear through between the leaves of the gate and these leaves catch the animal's head back of the ears but do not do so in such a way as to choke the animal or break its neck, which is an objectionable feature found in many old-style hog clamps. Furthermore, the leaves hold the hog in such a way there is no pain and consequently no squealing.

When the hog has been ringed, if the hog is not too large, the lever can be pulled out, separating the leaves, and the animal can go forward between the leaves. If the hog is too large, then the gate itself can be released, that is, the latches 42 raised and the gate swung back upon its hinges and the hog can go right through. The wing 46 will not be used when the gate is used with a crate inasmuch as the crate itself is provided with a wing 53. However, in many cases a veterinary will take the gate by itself for the purpose of hog ringing and put the gate up on a post by means of hooks 48. In this case the wing 46 is set so as to cause the hog or other animal to stick its head through the space between the leaves. Thus it may be used for vaccinating and the veterinary will not have to haul a crate along with him.

It will be understood that the exact location of the hooks 48 is not material, provided there is a hook at the top of the gate and at the bottom of the gate so that the gate may be used separately from the crate and supported upon trees, posts, or the like. Thus this gate may be sold separately to farmers, veterinarians or anyone who might have use for the gate separately from the crate, and this gate may be used for the purposes heretofore referred to.

While I have illustrated the crate as being formed of slats on both sides, yet it will be understood that it can be built with slats or solid, either on one or both sides as in some cases where the crate is to be used for dehorning calves it is an advantage to have the crate solid, for if it were not solid the calves in struggling might get their legs through the spaces between the slats and injure themselves. This crate and gate may be of wood, metal, or any other suitable material which is available for the purpose.

While I have illustrated certain details of construction and arrangement of parts which I believe to be particularly effective for the purpose intended, I do not wish to be limited thereto, as it is obvious that many changes might be made in the details without departing from the spirit of the invention as defined in the appended claims.

I claim:—

1. A gate for animal crates, the gate being provided with opposed hinged leaves yieldingly urged rearward toward a closed position but movable by the animal into a forwardly convergent position permitting the animal to insert its head between the leaves but preventing a retraction of the head, the leaves being supported for bodily adjustment one toward the other, and manually operable means for shifting one of said leaves toward the other leaf to thus adjust the space between the leaves.

2. In a hog ringing device, a gate having a fixed member and a sliding member extending parallel to the fixed member, a pair of leaves hinged to said members and yieldingly urged inward or toward each other, and means limiting the outward movement of the leaves to a position of forward convergence, and means for holding the shiftable member and its leaf in any adjusted position.

3. In a hog ringing device, a gate having a fixed member and a sliding member extending parallel to the fixed member, a pair of leaves hinged to said members and yieldingly urged inward or toward each other, means limiting the outward movement of the leaves to a position of forward convergence, means for holding the shiftable member and its leaf in any adjusted position, comprising a lever mounted upon the gate, a link connection from the lever to the sliding member, and means for latching the lever in adjusted positions.

4. In a hog ringer, a gate having vertical posts and transverse members, one of said vertical posts having a leaf hinged thereto, a sliding post mounted upon the gate parallel to the leaves supporting the leaf and shiftable to or from the latter and having a leaf hinged thereto, manually operable means for shifting the sliding post to carry the leaf thereof toward or from the other leaf, means for holding the sliding post in its adjusted position, resilient means yieldingly resisting outward movement of the leaves, and stops limiting the outward movement of the leaves to a position of forward convergence.

5. A gate for animal crates carrying two opposed hinged leaves, one of said leaves being adjustable toward the other leaf, manually operable means for adjusting said last adjustable leaf and holding it in its adjusted position including a lever having a locking device, resilient means urging the leaves toward each other, stops limiting the outward movement of the leaves to a position of forward convergence, and a guiding wing hingedly attached to the back of the gate and having means whereby it may be held in angular relation to the gate.

6. A gate for animal crates adapted to be detachably engaged with the forward end of the crate, the gate having leaves hingedly mounted thereon, means for resiliently urging the hinged leaves inward, means for limiting the outward movement of the hinged leaves, manually operable means for adjusting one of said hinged leaves toward or from the other and holding it in its adjusted position, and a wing hingedly mounted upon the inner face of the gate and having means whereby it may be held in laterally and rearwardly inclined position.

In testimony whereof I hereunto affix my signature.

NEWELL BROWN.